(12) United States Patent
Elmouden et al.

(10) Patent No.: US 11,667,387 B2
(45) Date of Patent: Jun. 6, 2023

(54) ICE PROTECTION AND BOUNDARY LAYER SUCTION SYSTEM FOR AN AIRCRAFT AEROFOIL

(71) Applicant: SONACA S.A., Gosselies (BE)

(72) Inventors: Said Elmouden, Mons (BE); Nicolas Dellisse, Burdinne (BE)

(73) Assignee: SONACA S.A., Gosselies (BE)

( * ) Notice: Subject to any disclaimer, the term of this patent is extended or adjusted under 35 U.S.C. 154(b) by 0 days.

(21) Appl. No.: 17/419,515

(22) PCT Filed: Sep. 23, 2020

(86) PCT No.: PCT/EP2020/076562
§ 371 (c)(1),
(2) Date: Jun. 29, 2021

(87) PCT Pub. No.: WO2021/058560
PCT Pub. Date: Apr. 1, 2021

(65) Prior Publication Data
US 2022/0212805 A1 Jul. 7, 2022

(30) Foreign Application Priority Data
Sep. 24, 2019 (BE) .................................. 2019/5628

(51) Int. Cl.
*B64C 21/06* (2023.01)
*B64C 3/14* (2006.01)
(Continued)

(52) U.S. Cl.
CPC .............. *B64D 15/04* (2013.01); *B64C 21/06* (2013.01); *B64C 3/14* (2013.01); *B64C 21/04* (2013.01);
(Continued)

(58) Field of Classification Search
CPC ....... B64D 15/04; B64C 21/02; B64C 21/025; B64C 21/06; B64C 21/08; B64C 3/14;
(Continued)

(56) References Cited

U.S. PATENT DOCUMENTS

2010/0116943 A1* 5/2010 Meister ................. B64D 15/04
244/208
2019/0263529 A1* 8/2019 Edwards ................ B64D 15/04

FOREIGN PATENT DOCUMENTS

DE 69309666 T2 7/1997
EP 0436243 A2 * 7/1991 ............. B64D 15/04
(Continued)

OTHER PUBLICATIONS

Search Report issued in Belgium Patent Application No. 201905628 dated May 25, 2020.
(Continued)

*Primary Examiner* — Tien Q Dinh
*Assistant Examiner* — Katherine June Bolek
(74) *Attorney, Agent, or Firm* — Pearne & Gordon LLP

(57) ABSTRACT

A system for suction of the boundary layer of a wing and protection against icing of this wing includes a wall including micro-perforations and delimiting a leading edge extended by a pressure-side wall and by a suction-side wall. The system also includes a perforated tube running along the leading edge, an exhaust duction for sucking air from this tube in order to suck the boundary layer successively via the micro-perforations of the wall and via the perforations of the tube, and a supply duct for blowing hot air into this perforated tube during a phase of protection against icing, this hot air being discharged successively via the perforations of the tube and via the micro-perforations of the wall.

7 Claims, 3 Drawing Sheets

(51) Int. Cl.
*B64C 21/04* (2023.01)
*B64D 15/04* (2006.01)

(52) U.S. Cl.
CPC ...... *B64C 2230/04* (2013.01); *B64C 2230/06* (2013.01); *B64C 2230/20* (2013.01); *B64C 2230/22* (2013.01)

(58) Field of Classification Search
CPC ............ B64C 2230/04; B64C 2230/06; B64C 2230/20; B64C 2230/22
See application file for complete search history.

(56) References Cited

FOREIGN PATENT DOCUMENTS

| | | | |
|---|---|---|---|
| EP | 0436243 | A2 | 7/1991 |
| EP | 0630807 | A1 | 12/1994 |
| EP | 3431395 | A1 | 1/2019 |
| EP | 3533712 | A1 | 9/2019 |
| WO | WO-2009127652 A2 * | 10/2009 | ............. B64C 21/04 |

OTHER PUBLICATIONS

International Search Report for Application No. PCT/EP2020/076562 dated Dec. 16, 2020.
Written Opinion for PCT/EP2020/076562 dated Dec. 16, 2020.

\* cited by examiner

ICE PROTECTION AND BOUNDARY LAYER SUCTION SYSTEM FOR AN AIRCRAFT AEROFOIL

This is the National Stage of PCT international application PCT/EP2020/076562, filed on Sep. 23, 2020 entitled "SYSTEM FOR SUCTION OF THE BOUNDARY LAYER AND PROTECTION AGAINST ICING OF AN AIRCRAFT BEARING SURFACE", which claims the priority of Belgium Patent Application No. 2019/5628 filed Sep. 24, 2019, both of which are incorporated herein by reference in their entirety.

TECHNICAL FIELD

The invention relates to a boundary layer suction and ice protection system for an aircraft aerofoil such as a wing or a tail unit.

PRIOR ART

It is known to equip an aircraft aerofoil with an ice protection system comprising channels wherein hot air circulates in order to avoid the formation of ice. It is also known to perforate the wall of this wing in order to suck the boundary layer, that is to say the air running along the outer surface of this wall, by means of suction channels also equipping this wing.

The ice protection is activated during the take-off, landing or landing approach phase, whereas the boundary layer suction, which makes it possible to reduce the drag of the wing, is activated during the cruising flight phase.

In practice, the wall of a wing, also called skin, delimiting at the upstream portion thereof a curved leading edge extended towards the downstream by a lower surface and by an upper surface, and it is necessary to prevent the formation of ice and suck the boundary layer at the leading edge and at an upstream portion of the upper surface.

It appears that the known systems having these two functionalities have relatively complex structures that are detrimental from the point of view of the integration thereof into the upstream portion of the wing.

The aim of the invention is to provide a system offering the boundary layer suction and ice protection functions, which is simplified in order to equally facilitate the integration thereof into the wing.

DESCRIPTION OF THE INVENTION

To this end, one object of the invention is a boundary layer suction and ice protection system for an aircraft aerofoil, including a wall provided with micro-perforations and delimiting a leading edge extended by a lower surface wall and by an upper surface wall, with an inner wall linking the upper surface wall to the lower surface wall and delimiting with the leading edge a front bay, this system including a perforated tube running along the leading edge by extending into the front bay, a check valve coupled to the tube to allow the intake of air into the tube through the flapper valve and to prohibit the backflow of air coming from the tube through the flapper valve, means for sucking the air from this tube in order to suck the boundary layer successively via the micro-perforations of the wall and the perforations of the tube, and means for blowing hot air into this perforated tube during the ice protection phase, this hot air being evacuated successively via the perforations of the tube and the micro-perforations of the wall.

The invention thus provides a simplified solution since it is not necessary to envisage a circuit for recovering the ice protection air, this hot air being evacuated directly towards the outside. Thanks to the invention, the ice protection air is overpressurised essentially in the perforated tube, such that it is not necessary to oversize the elements delimiting the enclosure of the front bay so that they withstand a high pressure.

Another object of the invention is a system thus defined, including a rear bay running along an inner face of the upper surface, and linked to the front bay by openings traversing the inner wall.

Another object of the invention is a system thus defined, including a check valve coupled on the one hand to the tube and on the other hand to the rear bay by a duct traversing the inner wall, to allow the intake of air into the tube coming directly from the channels.

Another object of the invention is a system thus defined, wherein the rear bay includes channels each linked to at least one opening traversing the inner wall.

Another object of the invention is a system thus defined, comprising a flapper valve equipping a low point of the front bay, in order to evacuate during a maintenance operation, the condensed water in the front bay by opening this flapper valve.

Another object of the invention is a system thus defined, comprising a flapper valve equipping the front bay in order to avoid an overpressurisation of the front bay during the ice protection phase, in case of clogging of micro-perforations of the wall of the aerofoil.

Another object of the invention is a system thus defined, comprising the same flapper valve for evacuating condensed water and for limiting overpressurisation.

DETAILED DESCRIPTION OF SPECIFIC EMBODIMENTS

Figure 1:
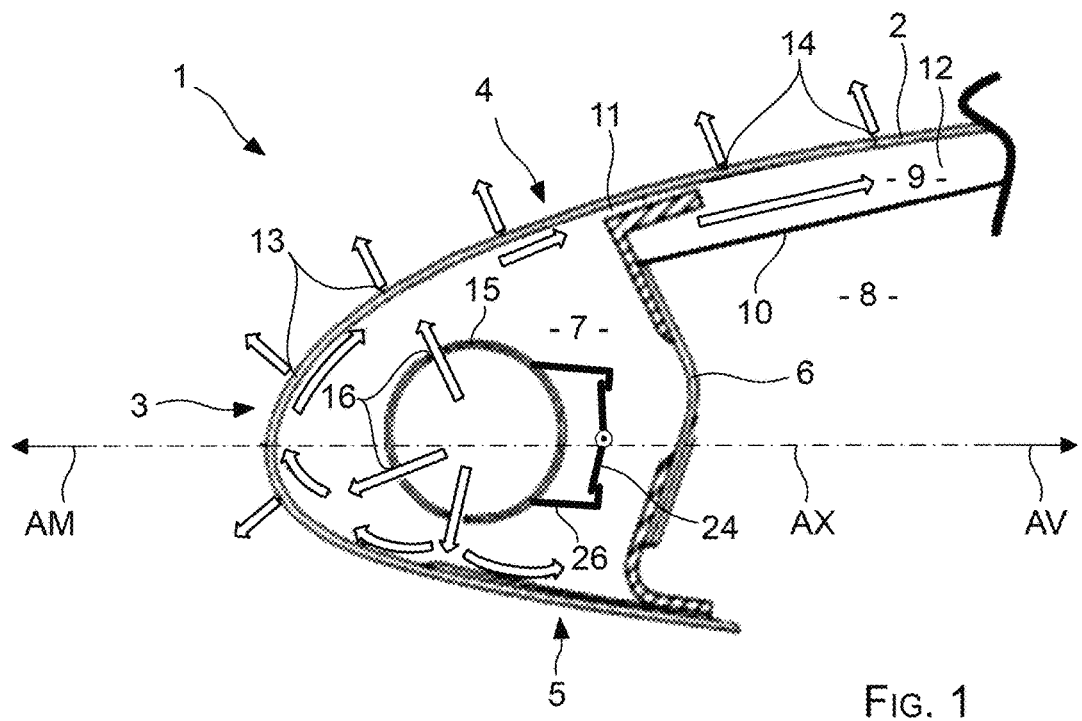
FIG. 1 is a sectional view of a wing equipped with the system according to the invention during the ice protection phase.

In FIG. 1, a wing front portion 1 shown in sectional view includes a curved outer wall 2 to delimit a leading edge 3 in the region of greater curvature thereof, extended by an upper surface 4 and by a lower surface 5 that are walls of low curvature extending in general directions substantially coinciding with the forward direction of the wing in operation. This forward direction corresponds to a longitudinal axis referenced by AX, according to an upstream orientation referenced by AM, such that the lower surface and the upper surface extend towards the downstream AV of the leading edge.

Additionally, the upper surface 4 and the lower surface 5 are linked to one another by an inner wall 6 that extends perpendicular to the forward direction downstream of the leading edge 3. This wall separates the wing 1 into a front bay 7 extending from the leading edge until the wall 6 and a rear portion 8 extending beyond the wall 6, towards the downstream AV that is to say in direction opposite to the leading edge 3. This rear portion 8 includes a rear bay 9 delimited by a wall 10 that runs along the upper surface wall 4 by being spaced apart from it by being in communication with the front bay 7.

This wall 6 extends from the lower surface wall 5 until the upper surface wall 4. It is connected to the lower surface wall 5 by a closed junction, that is to say not able to be traversed by air. But this wall 6 is connected to the upper surface wall 4 by a junction including a series of openings 11, making it possible for air to get past this wall 6 by running along the inner face of the upper surface wall 4, the front bay 7 and the rear bay 9 thus being in communication with one another. The openings 11 are spaced apart from one another along the wing 1, that is to say along a transverse direction perpendicular to the axis AX.

The rear bay may include a series of longitudinal channels 12 extending along the axis AX spaced apart from one another in the transverse direction. Each channel 12 then extends into the rear bay 9 from the wall 6 where it is directly coupled to a corresponding opening 11, until a downstream end of the rear bay that is closed. These channels 12 are represented by dotted lines on the drawings to show the fact that they are optional.

The wall 2 includes micro-perforations 13 traversing the leading edge 3 thereof and placing the external environment in communication with the front bay 7, and micro-perforations 14 traversing the upper surface wall 4 to place the external environment in communication with the interior of the channels 12.

As seen in FIG. 1, the front bay 7 contains a perforated tube 15, also called piccolo tube, which extends over an entire portion of the wing 1 in the transverse direction, and which makes it possible to blow hot air during the de-icing phase. This tube 15, also called piccolo tube, includes perforations 16 for diffusing into the front bay 7 hot air provided by a supply system 17 during the ice protection phase.

This supply system 17 includes a supply duct 18 taking air from a hot portion of an engine in order to inject it into the tube 15 to which it is directly connected. This supply duct 18 is equipped with a valve 19 and a three-way valve 21 mounted in series between the engine and the tube 15, the valve 21 further being linked to an exhaust duct 22.

The hot air taken on the engine is advantageously temperature regulated in a heat exchanger not shown, before being injected into the perforated tube 15. Additionally, a control valve may be envisaged to regulate the pressure in the tube 15, and thereby the air flow rate in this tube 15.

Figure 2:
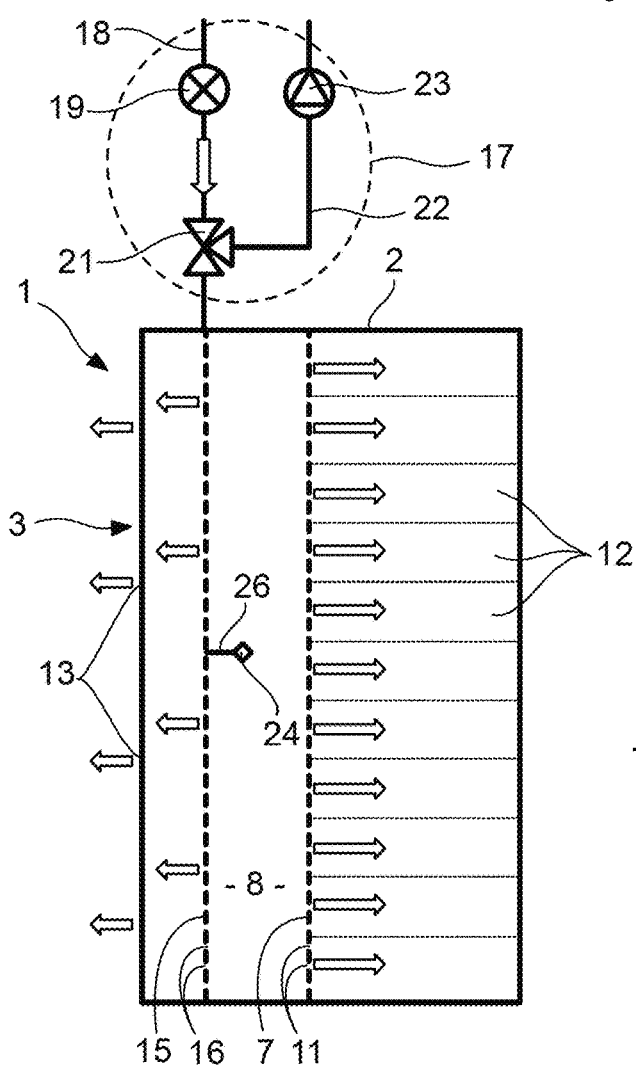
FIG. 2 is a top view schematically showing a wing portion equipped with the system according to the invention during the ice protection phase.

As illustrated in FIGS. 1 and 2, during the ice protection phase, the valve 21 is controlled in order to place the valve 19 in communication with the tube 15 and to isolate the exhaust duct 22 from the circuit, and the valve 19 is activated. In this configuration, the hot air arrives pressurised in the tube 15 to supply the front bay 7 through the perforations 16 so as to pressurise it while being projected against the inner face of the leading edge 3. A portion of this hot air exits via the micro-perforations 13 opening directly into the front bay 7, and another portion of this hot air travels towards the downstream AV into the rear bay 9 via the openings 11 to exit via the micro-perforations 14 formed in the upper surface 4 and opening directly into this rear bay 9.

Thus, in ice protection mode, the hot air enters directly into contact with the outer face of the wall 2 of the wing, that is to say with a film of water running over the outer face of the wall, and with the boundary layer that designates the external air running along the leading edge and the upper surface. The hot air circulating in the tube 15 is fully or at least essentially extracted through the outer micro-perforated wall 2, such that the heat is diffused entirely over the leading edge and the upper surface of the wing.

Figure 3:
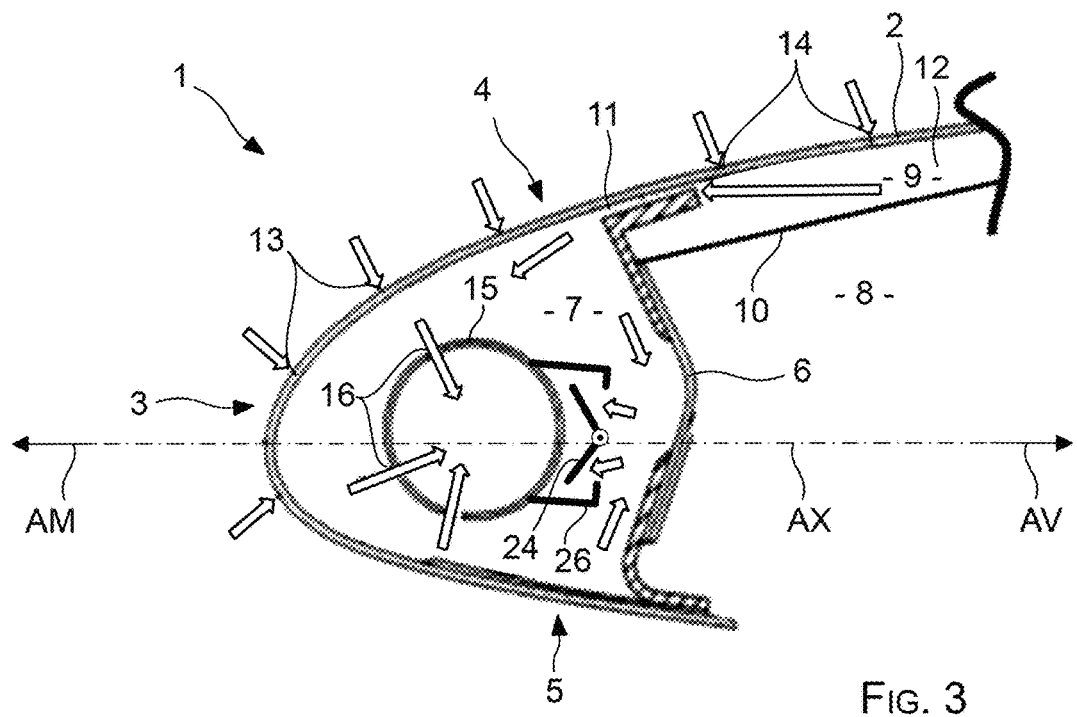
FIG. 3 is a sectional view of a wing equipped with the system according to the invention during the boundary layer suction phase.

As schematically shown in FIG. 3, the system of FIGS. 1 and 2 is also capable of operating in order to suck the boundary layer running along the wall 2 at the leading edge and at the upper surface in such a way as to reduce the drag of the wing, in particular during the cruising flight phase.

In this case, the three-way valve 21 is controlled to place the exhaust duct 22 in communication with the tube 15 and to isolate the supply duct 18 from the rest of the circuit, and a suction pump 23 equipping the exhaust duct 22 is activated.

In this boundary layer suction configuration, the tube 15 is in negative pressure in order to suck via perforations 16 thereof the air present in the front bay 7. Thus, as schematically shown in FIG. 3, the air of the boundary layer running along the outer face of the leading edge 3 is sucked via the micro-perforations 13 to enter into the front bay 7 and to subsequently be extracted therefrom by the tube 15. Similarly, the negative pressure of the front bay causes the air of the boundary layer running along the upper surface 4 to be sucked via the micro-perforations 14 opening into the rear bay 9 that are themselves in negative pressure due to the fact that they communicate with the front bay 7 via the openings 11.

In order to increase the suction flow rate required during the boundary layer suction phase, the tube 15 is equipped with one or more suction valves such as the flapper valve referenced by 24.

Figure 5:
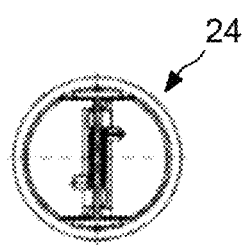
FIG. 5 is a schematic view of a check valve able to equip the system according to the invention.

In the example of the figures, the flapper valve 24 is mounted at the downstream end of a tubular end piece 26 extending perpendicular to the tube 15 to which the upstream end thereof is coupled. This flapper valve 24 that is shown alone in FIG. 5 is a check valve configured to allow the intake of air into the end piece 26, from the bay 7 towards the tube 15, and to prohibit the egress of air coming from the tube 15 towards the bay 7. In these conditions, this flapper valve makes it possible to dispose of a section that is more important for the suction of air out of the tube 15 than for the supply of hot air by means of this same tube 15.

Figure 4:
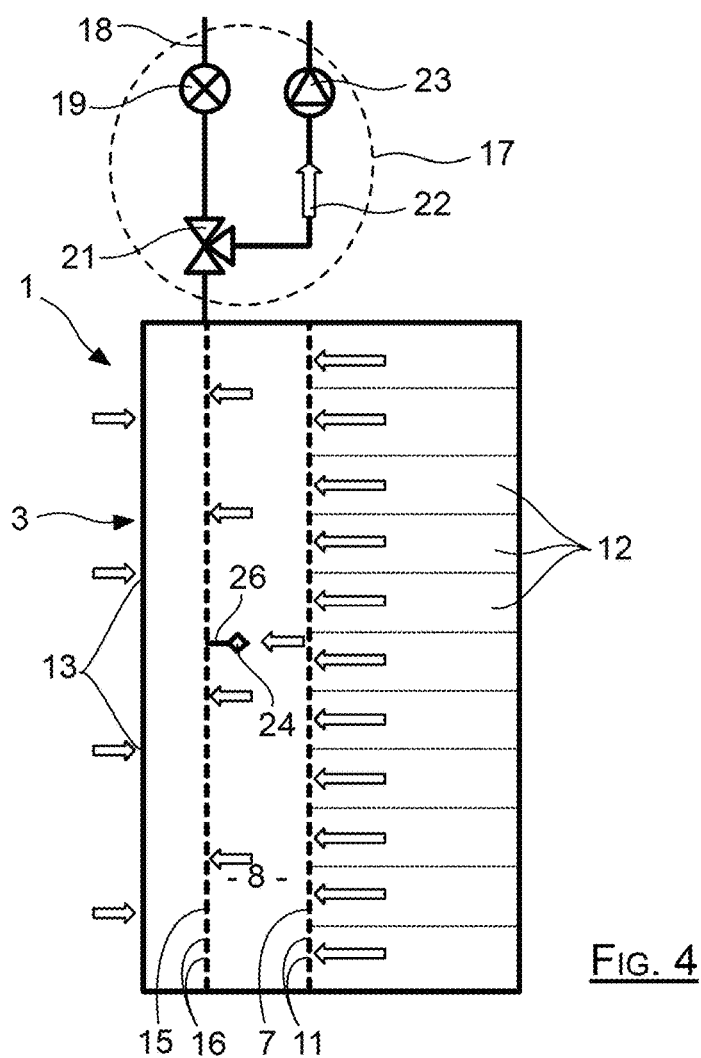
FIG. 4 is a top view schematically showing a wing portion equipped with the system according to the invention during the boundary layer suction phase.

As shown in FIG. 4, the end piece 26 is oriented towards the downstream in order to support the check valve 24 at the free end thereof, which makes it possible to effectively depressurise the entire front bay 7.

Figure 6:
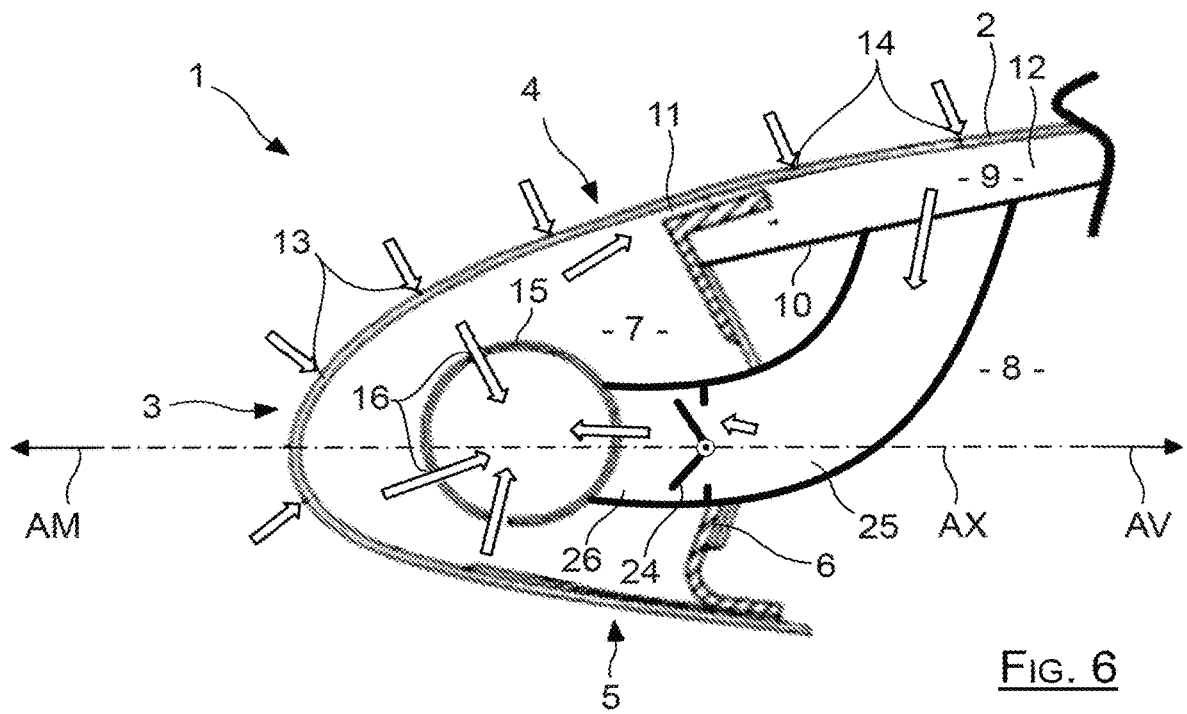
FIG. 6 is a sectional view of a wing equipped with a variant of the system according to the invention during the boundary layer suction phase.

According to one variant shown in FIG. 6, the downstream of the end piece 26 is coupled directly to the rear bay by a duct 25 traversing the inner wall 6, so as to directly suck the air along the upper surface wall 4 in order to increase the efficiency of the suction in that region of the wing.

This variant may be envisaged alternately or additionally to the solution described with reference to FIG. 3. In other words, the tube 15 may be coupled on the one hand to one or more check valves equipping one or more end pieces opening into the front bay 7, and on the other hand to one or more check valves equipping one or more additional pipes coupled to the rear bay 9.

Figure 7:
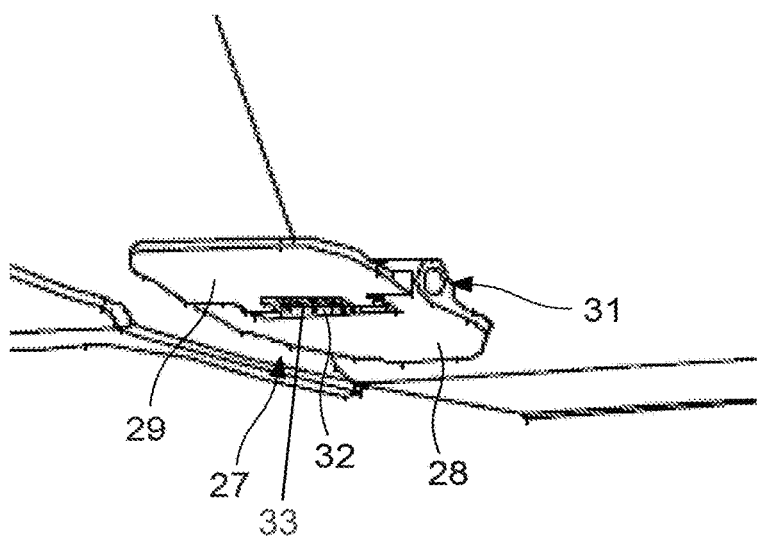
FIG. 7 is a perspective representation of a depressurisation and dump valve of the system according to the invention.

During operation, the moisture present in the sucked boundary layer condenses in the front bay 7 to collect at a low point of this front bay 7, located substantially at the lower surface wall. Advantageously, the lower surface is equipped at the low point of the front bay 7 with a flapper valve 27 opening towards the outside, such as schematically shown in FIG. 7. This flapper valve 27 makes it possible for a maintenance operator to drain the moisture accumulated in the front bay 7, simply by opening it towards the outside.

As can be understood, the flapper valve 27 opening just towards the outside only allows the egress of liquid or fluid out of the front bay 7. It may thus also be used to limit an overpressurisation of the front bay 7 if the micro-perforations 13, 14 would be clogged during the ice protection phase. In other words, the flapper valve 27 making it possible to manually drain the accumulated moisture is advantageously also a check valve set to limit the overpressure in the front bay 7.

As schematically shown in FIG. 7, such a flapper valve 27 may be formed by a fixed flap 28 rigidly integral with the lower surface wall, to which a moveable flap 29 is articulated by a hinge 31 comprising a pin 32 bearing a helical spring 33 opposite the opening of the moveable flap 29. In these conditions, the opening of the moveable flap 29 requires applying on it a force greater than that of the tare of the spring 33. This opening force may be exerted either by an operator pulling the moveable flap 29 to drain the accumulated moisture, or by a pressure increase in the front bay 7 during the ice protection phase if too many micro-perforations of the wall 2 are clogged.

What is claimed is:

1. Boundary layer suction and ice protection system for an aircraft aerofoil, including a wall provided with micro-perforations and delimiting a leading edge extended by a lower surface wall and by an upper surface wall, with an inner wall linking the upper surface wall to the lower surface wall and delimiting with the leading edge a front bay, this system including a perforated tube running along the leading edge by extending into the front bay, a check valve coupled to the tube to allow the intake of air into the tube through the check valve and to prohibit the backflow of air coming from the tube through the check valve, means for sucking the air from this tube in order to suck the boundary layer successively via the micro-perforations of the wall and the perforations of the tube, and means for blowing hot air into this perforated tube during the ice protection phase, this hot air being evacuated successively via the perforations of the tube and the micro-perforations of the wall.

2. System according to claim 1, including a rear bay running along an inner face of the upper surface, and linked to the front bay by openings traversing the inner wall.

3. System according to claim 2, wherein the check valve is coupled on the one hand to the tube and on the other hand to the rear bay by a duct traversing the inner wall, to allow the intake of air into the tube coming directly from the channels.

4. System according to claim 2, wherein the rear bay includes channels each linked to at least one opening traversing the inner wall.

5. System according to claim 1, comprising a flapper valve equipping a low point of the front bay, in order to evacuate during a maintenance operation, the condensed water in the front bay by opening the flapper valve.

6. System according to claim 1, comprising a flapper valve equipping the front bay in order to avoid an overpressurisation of the front bay during the ice protection phase, in case of clogging of micro-perforations of the wall of the aircraft.

7. System according to claim 5, comprising the same flapper valve for evacuating condensed water and for limiting overpressurisation.

\* \* \* \* \*